Dec. 25, 1962  H. BOBROWSKI  3,070,221
ADJUSTABLE AUGER INTAKE SHIELD AND DEFLECTOR
Filed Feb. 29, 1960

INVENTOR.
HENRY BOBROWSKI
BY
HIS ATTYS

United States Patent Office 3,070,221
Patented Dec. 25, 1962

3,070,221
ADJUSTABLE AUGER INTAKE SHIELD
AND DEFLECTOR
Henry Bobrowski, 460 Montague Ave., Winnipeg 13,
Manitoba, Canada
Filed Feb. 29, 1960, Ser. No. 11,871
4 Claims. (Cl. 198—213)

My invention relates to new and useful improvements in auger intakes. The intake end of conventional augers usually consist of two or three bars extending beyond the end of the auger tube with the lower end of the auger flight rotating within the bars. This permits grain to be picked up by the lower end of the augar flight and to be elevated within said tube. However, this is relatively satisfactory when used under optimum operating conditions, nevertheless considerable hand shoveling is necessary under certain circumstances in order to derive the best efficiency from the auger.

For example, if the end of the auger is placed upon a pile of grain, the weight of the intake end of the augar, due to the positioning thereof, is sometimes not sufficient to maintain the auger in engagement with the grain or, alternatively, grain tends to be sprayed outwardly by the rotating auger rather than be picked up thereby.

Furthermore when operating within a container which is not of regular dimensions, the grain has to be shoveled towards the intake particularly when the quantity of grain being augered becomes relatively small.

In most conditions, unless the auger end can be buried within the pile of grain, considerable spraying occurs during operation.

I have overcome these disadvantages by providing a semi-circular shield around the open end of the auger which can be positioned frictionally as desired and which prevents this undesirable spraying of grain during operation.

For example, if the end of the auger is placed upon the upper surface of a pile of grain, the deflector or shield can be moved so that it covers the upper portion of the augar flight thus preventing spraying entirely.

Alternatively, when the device is working in an awkward position, the shield can be turned to get the best possible efficiency from the pickup end of the auger.

The principal object and essence of my invention is therefore to provide a device of the character herewithin described which is adjustable through 360 degrees in order to suit the condition under which the auger is operating.

Another object of my invention is to provide a device of the character herewithin described which prevents the spraying of grain which sometimes occurs during the augering thereof.

A yet further object of my invention is to provide a device of the character herewithin described, which, when used upon the upper surface of a pile of grain, shields the rotating auger flight thus making the device much safer in operation.

Still another object of my invention is to provide a device of the character herewithin described which is simple in construction, economical in operation, and otherwise well suited to the purpose for which it is designed.

With the foregoing objects in view and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
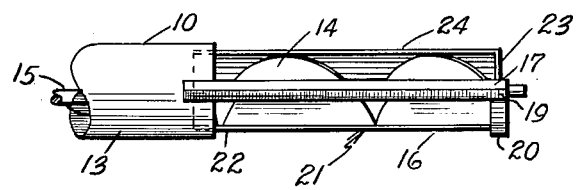
FIGURE 1 is a side elevation of the lower end of a grain auger with my device in situ.
Figure 2:
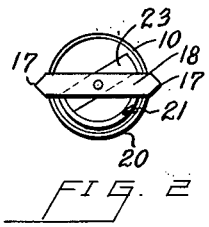
FIGURE 2 is an end elevation of FIGURE 1.
Figure 3:
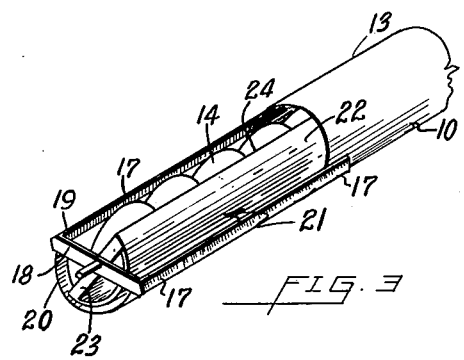
FIGURE 3 is an isometric fragmentary view of the lower end of a grain auger, with my device in situ.

Proceeding therefore to describe my invention in detail, reference should be made to the accompanying drawings in which I have shown the lower end 10 of an auger tube 13 carrying an auger flight 14 mounted upon a rotatable shaft 15.

Extending from the lower end 10 of the auger tube I have provided supporting structure taking the form of a pair of angle irons 16 welded or otherwise secured by the ends 17 thereof to the outer surface of the auger tube so that the member extend diametrically one upon each side of the tube and parallel one to the other.

A cross member or strap 18 spans the distal ends 19 of the members 16 and is secured thereto as by welding. A semi-circular hoop 20 is also secured by the ends thereof to the distal ends 19 of the members 16 and extends downwardly in a semi-circular manner and acts as a ground engaging member to keep the auger flight clear of the ground.

My device collectively design 21 consists of a semi-cylindrical shield 22 having a diameter or radius similar to the diameter or radius of the auger tube 10 and adapted to be journalled frictionally within the end of the auger tube as shown in phantom in the drawings.

A strap 23 spans the edges 24 of the shield at the ends opposite to the ends inserted within the auger tube and this strap is apertured and engageable over the aforementioned shaft 15 where same is journalled for rotation within the cross strap 18.

In operation, the shield is positioned manually as desired and is maintained in the desired position by the frictional engagement of the shield within the end of the auger tube 10. By positioning the shield according to the circumstances, spraying of grain is prevented and in fact the pickup efficiency of the auger is facilitated under certain circumstances.

Since various modifications can be made in my invention as hereinabove described, and many apparently widely different embodiments of same made within the spirit and scope of the claims without departing from such spirit and scope, it is intended that all matter contained in the accompanying specifications shall be interpreted as illustrative only and not in a limiting sense.

What I claim as my invention is:

1. In a grain auger including an auger tube, an auger flight rotatable therein and mounted on a shaft, and an open intake end to said tube; supporting structure extending from the lower end of said auger tube defining said intake end, ground engaging means associated with said structure, a semi-cylindrical shield partially surrounding the portion of said auger flight extending into said intake, said shield being mounted in said intake for selective positioning rotatable around said portion of said auger flight, said supporting structure includes a pair of members secured to said auger tube diametrically from one another and extending in spaced and parallel relationship therefrom, a cross member spanning the distal ends of said members, said shaft being journalled for rotation within said cross member, said shield being journalled frictionally by one end thereof within the end of said auger tube, and being freely supported by the other end upon said shaft adjacent said cross member.

2. The device according to claim 1 in which said journalling of said other end of said shield includes a strap spanning the edges of said shield.

3. The device according to claim 2 in which said ground engaging means includes a semi-circular hoop secured by the ends thereof to the distal ends of said members.

4. The device according to claim 3 in which the radius of said shield is substantially similar to the radius of said auger tube.

References Cited in the file of this patent
UNITED STATES PATENTS

| | | |
|---|---|---|
| 1,859,625 | Laing | May 24, 1932 |
| 2,395,410 | Kaesler | Feb. 26, 1946 |
| 2,606,643 | Tidwell | Aug. 12, 1952 |
| 2,607,472 | Senstock | Aug. 19, 1952 |